US012036797B2

(12) United States Patent
Osakabe et al.

(10) Patent No.: US 12,036,797 B2
(45) Date of Patent: *Jul. 16, 2024

(54) INKJET PRINTER

(71) Applicant: BROTHER KOGYO KABUSHIKI KAISHA, Nagoya (JP)

(72) Inventors: Yoshinori Osakabe, Seto (JP); Masako Kawagoe, Nagoya (JP); Taichi Shirono, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/055,564

(22) Filed: Nov. 15, 2022

(65) Prior Publication Data

US 2023/0079790 A1 Mar. 16, 2023

Related U.S. Application Data

(60) Continuation of application No. 16/951,422, filed on Nov. 18, 2020, now Pat. No. 11,504,974, which is a division of application No. 15/718,846, filed on Sep. 28, 2017, now Pat. No. 10,870,284.

(30) Foreign Application Priority Data

Sep. 29, 2016 (CN) ........................ 201621094264.9

(51) Int. Cl.
*B41J 29/38* (2006.01)
*B41J 2/175* (2006.01)

(52) U.S. Cl.
CPC ....... *B41J 2/17513* (2013.01); *B41J 2/17553* (2013.01)

(58) Field of Classification Search
CPC ................ B41J 2/17509; B41J 2/17513; B41J 2/17553; B41J 29/13
See application file for complete search history.

(56) References Cited

U.S. PATENT DOCUMENTS 6,598,625 B2 * 7/2003 Allison ................ B41J 2/17509 141/2
7,334,861 B2 2/2008 Ha
7,874,661 B2 1/2011 Tidrick
9,834,001 B2 * 12/2017 Tanaka ..................... B41J 29/13
(Continued)

FOREIGN PATENT DOCUMENTS

JP 2008-296508 A 12/2008

*Primary Examiner* — Lam S Nguyen
(74) *Attorney, Agent, or Firm* — Merchant & Gould P.C.

(57) ABSTRACT

An inkjet printer includes a printer body and an ink container provided in the printer body. The ink container includes an ink containing portion, a frame portion and a cover portion. A top portion of the ink containing portion includes a port. The cover portion is pivotally connected to the frame portion and pivotable between an opened position, in which the port is exposed, and a closed position, in which the cover portion covers the port, with respect to the frame portion. The cover portion includes a sealing member provided corresponding to the port on an opposing surface of the cover portion. When the cover portion is in the closed position, the sealing member seals the port, and when the cover portion is in the opened position, the sealing member is separated from the port.

12 Claims, 7 Drawing Sheets

(56) References Cited

U.S. PATENT DOCUMENTS

| | | | |
|---|---|---|---|
| 2008/0029751 | A1 | 12/2008 | Umeda |
| 2012/0127245 | A1 | 5/2012 | Liu |
| 2014/0104349 | A1 | 4/2014 | Kimura et al. |

* cited by examiner

INKJET PRINTER

CROSS-REFERENCE TO RELATED APPLICATION

This application is a continuation of U.S. patent application Ser. No. 16/951,422, filed Nov. 18, 2020, which is a divisional of U.S. patent application Ser. No. 15/718,846, filed Sep. 28, 2017, now U.S. Pat. No. 10,870,284, issued Dec. 22, 2020, which claims priority from Chinese Utility Model Application No. 201621094264.9, filed on Sep. 29, 2016. The aforementioned applications are incorporated herein by reference in their entirety.

TECHNICAL FIELD

The disclosure relates to an inkjet printer.

BACKGROUND

Known inkjet printers, as depicted in FIG. 1, typically include a printer body 12 and a cover member 16 including a flatbed scanner, for example, therein. The cover member 16 is pivotally connected to the printer body 12 by a pivot shaft (not shown) provided on the rear side of the printer body 12 and pivotable between a first position, in which an upper surface of the printer body 12 is exposed, and a second position, in which the upper surface of the printer body 12 is covered. As depicted in FIG. 1, the printer body 12 has two ink containers 11 on the front side thereof at intervals. One of the two ink containers 11 is provided on the left side of the printer body 12 and includes one ink containing portion 13 and a cover portion 19 pivotally connected thereto. The other of the two ink containers 11 is provided on the right side of the printer body 12 and includes three ink containing portions 13 and a cover portion 19 pivotally connected thereto.

A refill port 14 through which ink is poured into the ink containing portion 13 is formed on the ink containing portion 13. Refer to FIG. 1, the ink containing portion 13 further includes a sealing member 15 for sealing the refill port 14 and a placing portion 17 on which the sealing member 15 may be rested. Before pouring ink, the user may first open the cover portion 19 and then remove the sealing member 15 to make an access to the refill port 14 and may place the sealing member 15 on the placing portion 17. When pouring ink into the ink containing portion 13, the ink is easily adhered to the refill port 14. As a result, the ink adhered to the refill port 14 may contaminate the sealing member 15 and the placing portion 17 by placing the sealing member 15 on the refill port 14 and on the placing portion 17.

As depicted in FIGS. 2 and 3, a known inkjet printer 20 may also include a cover member 26 which has a sealing member 25 on the bottom surface. The cover member 26 may be pivotable about a pivot shaft. As depicted in FIG. 3, when the cover member 26 is closed, the cover member 26 may cover not only an upper surface of the printer body 22 but also a refill port 24 provided on the printer body 22.

In the case that the cover member 26 is large in size, for example, at least A4 paper size, the cover member 26 may have a certain degree of weight. Therefore, play may be provided around the pivot shaft so that the cover member 26 can easily pivot. However, such play may affect the positioning accuracy between the sealing member 25 on the cover member 26 and the refill port 24 on the printer body 20.

SUMMARY

The present disclosure describes an inkjet printer that can hold the sealing member on the cover portion and reduce contamination of the user's hand or other objects with the ink adhered to the sealing member.

According to the one or more aspects of the disclosure, an inkjet printer may include a printer body and an ink container. The ink container may be provided in the printer body. The ink container may further include an ink containing portion, a frame portion, and a cover portion. The ink containing portion may be configured to contain ink to be supplied to the printer body. A top portion of the ink containing portion may include a port communicating with an inner space of the ink containing portion. The frame portion may be configured to accommodate the ink containing portion. The cover portion may be pivotally connected to the frame portion and pivotable between an opened position, in which the port is exposed, and a closed position, in which the cover portion covers the port, with respect to the frame portion. The cover portion may further include a sealing member provided corresponding to the port on an opposing surface of the cover portion which faces the frame portion. When the cover portion is in the closed position, the sealing member may seal the port, and when the cover portion is in the opened position, the sealing member may be separated from the port.

According to the one or more other aspects of the disclosure, an inkjet printer may include a printer body and an ink container. The ink container may be provided in the printer body. The ink container may further include an ink storage and a cover. A top portion of the ink storage may include a port communicating with an inner space of the ink storage. The cover may be pivotable between an opened position, in which the port is exposed, and a closed position, in which the cover covers the port. The cover may further include a sealing member provided on an opposing surface of the cover. When the cover is in the closed position, the sealing member may seal the port, and when the cover is in the opened position, the sealing member may be separated from the port.

According to the one or more other aspects of the disclosure, an inkjet printer may include a printer body, a first cover, and a second cover. The printer body may include an ink containing portion configured to contain ink to be supplied to the printer body. A top portion of the ink containing portion may include a port communicating with an inner space of the ink containing portion. The first cover may be pivotable about a first axis within a first pivotal range between a first opened position, in which the first cover is opened with respect to the ink containing portion, and a first closed position, in which the first cover covers the ink containing portion. The second cover may be pivotable about a second axis within a second pivotal range, which is smaller than the first pivotal range, between a second opened position, in which the second cover is opened with respect to the ink containing portion, and a second closed position, in which the second cover covers the ink containing portion. The second cover may include a sealing member configured to seal the port. A distance of the second cover from a central of the sealing member to the second axis may be less than a distance of the first cover from a point, which corresponds to the central of the sealing member, to the first axis.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

For a more complete understanding of the present disclosure, needs satisfied thereby, and the objects, features, and advantages thereof, reference now is made to the following descriptions taken in connection with the accompanying drawings. Hereinafter, illustrative embodiments of the disclosure will be described in detail with reference to the accompanying drawings. The terms “front”, “back”, “left”, “right”, “top” and “bottom” are used herein for the purpose of illustration and not of limitation. The terms “first” and “second” referenced herein are merely identification and do not have any other meaning, such as a particular order. For example, the term “first component” does not imply the presence of “second component”, and the term “second component” does not imply the presence of “first component”. The term “parallel” and “perpendicular” referenced herein means substantially “parallel” and “perpendicular”.

The inkjet printer according to the disclosure may have various functions such as an image scanner function, a facsimile function and a copier function, in addition to a printing function. The printing function may include a double-sided image recording function capable of recording an image on both side of a recording sheet.

Figure 1:
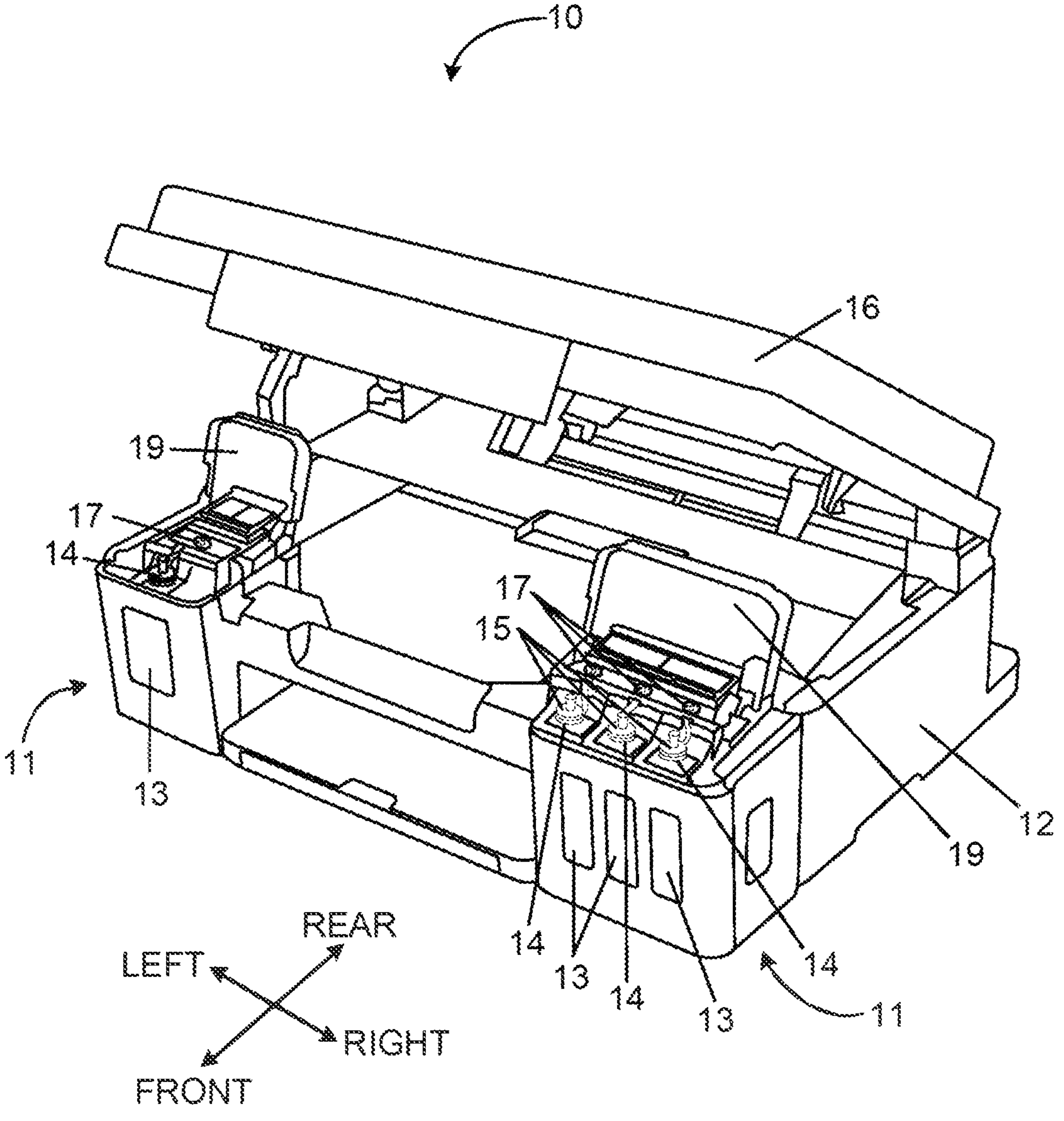
FIG. 1 is a perspective view depicting a conventional inkjet printer.
Figure 2:
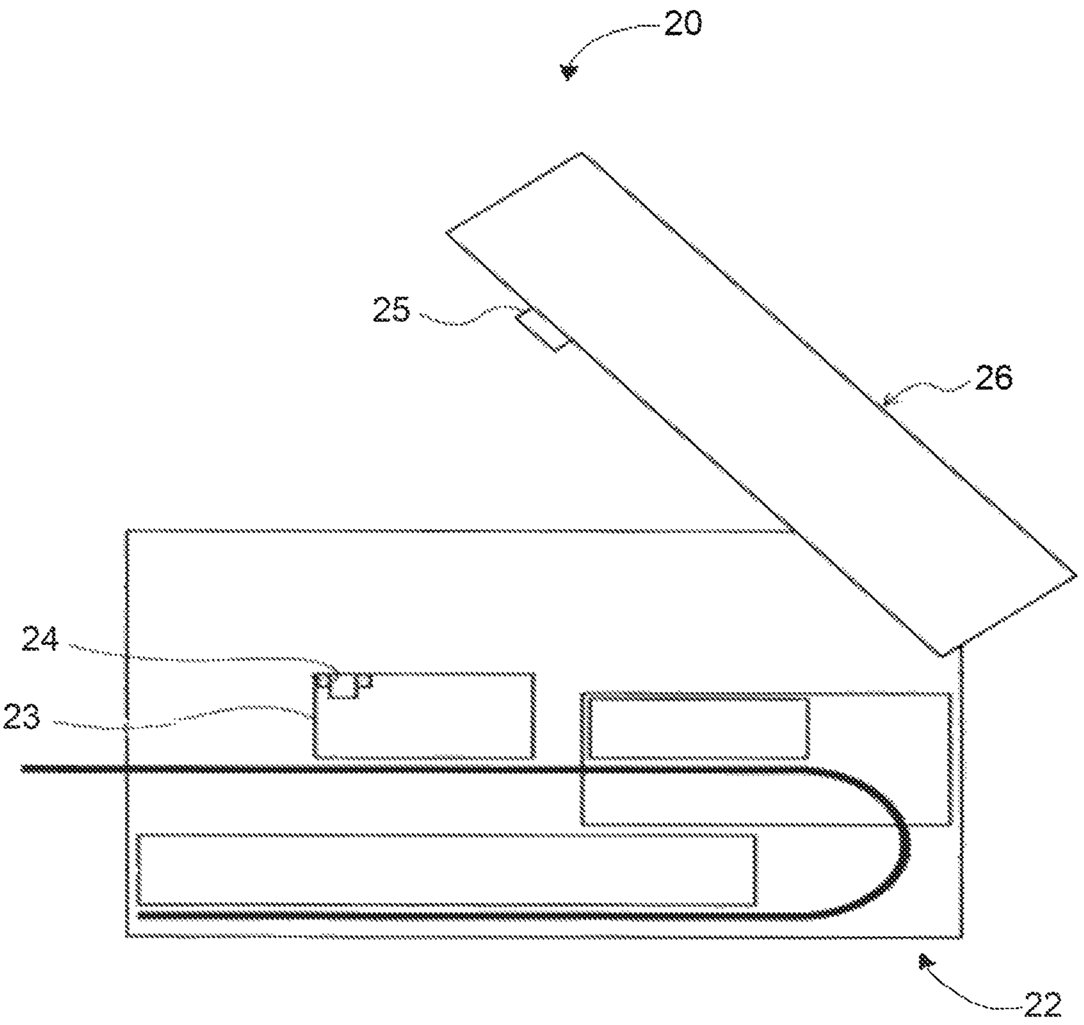
FIG. 2 is a schematic view depicting another conventional inkjet printer, in which the cover member is opened.
Figure 3:
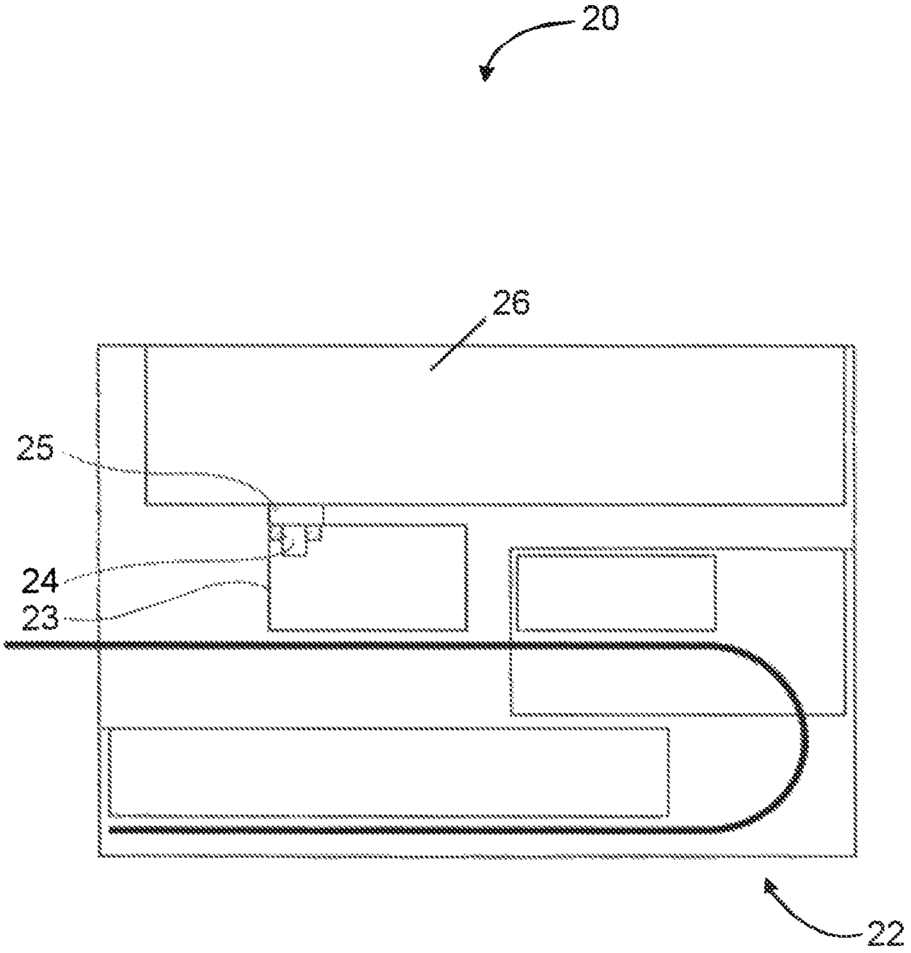
FIG. 3 is another schematic view depicting the inkjet printer of FIG. 2, in which the cover member is closed.
Figure 4:
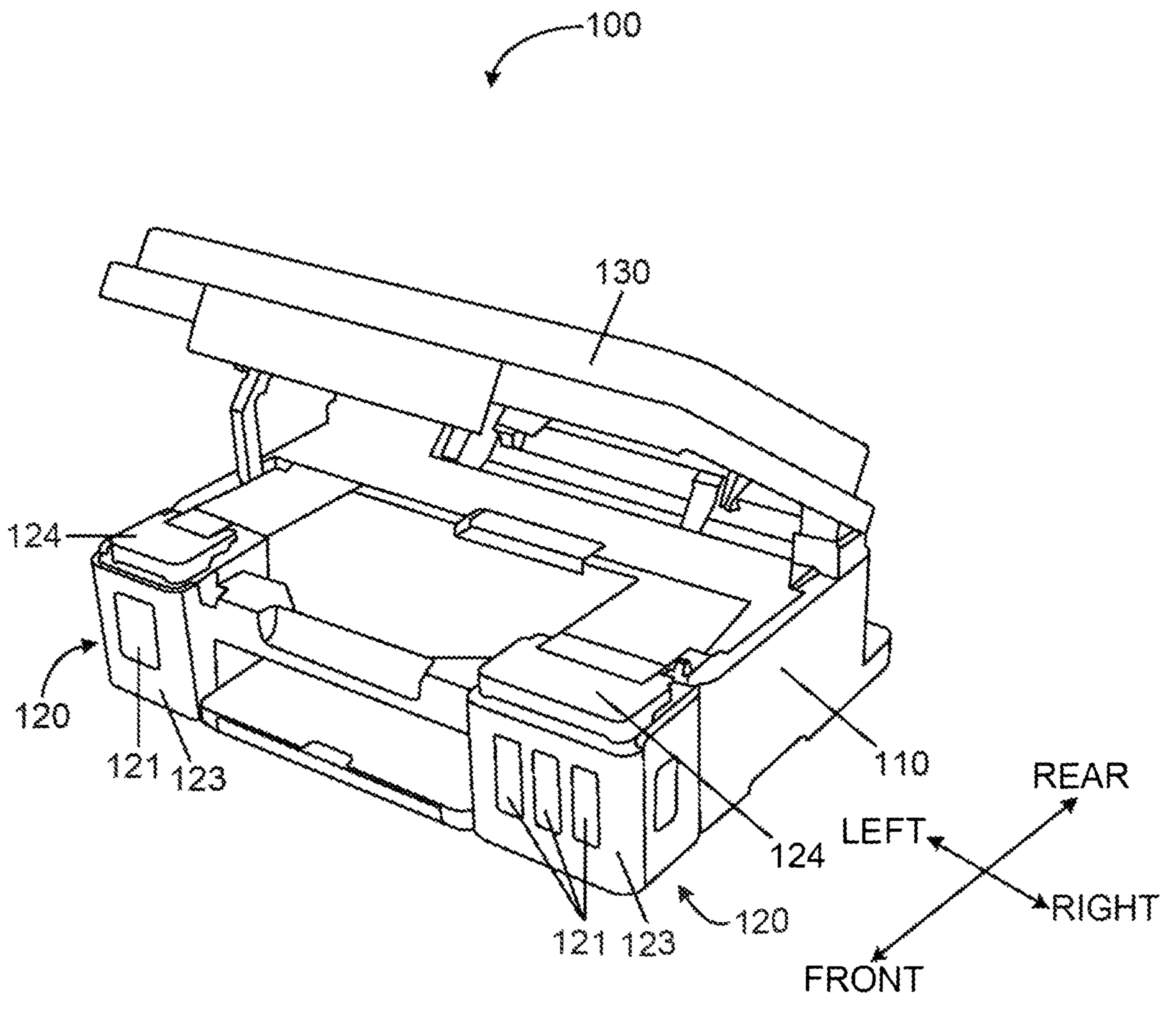
FIG. 4 is a perspective view depicting an inkjet printer in a first embodiment according to one or more aspects of the disclosure, in which the cover member is opened.
Figure 5:
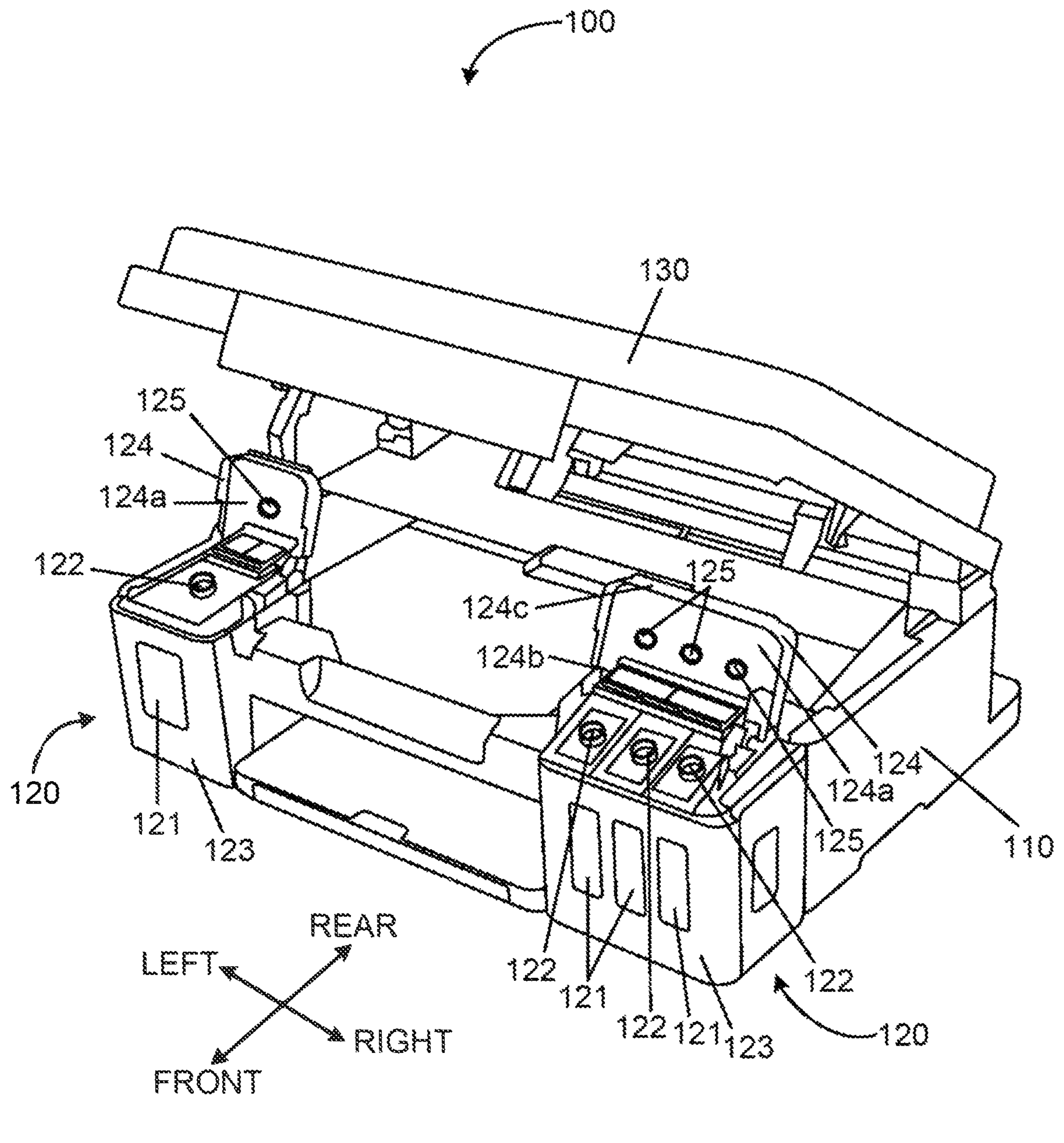
FIG. 5 is another perspective view depicting the inkjet printer in the first embodiment according to one or more aspects of the disclosure, in which both of the cover member and the cover portion are opened.

FIGS. 4 and 5 depict an inkjet printer 100 in a first embodiment according to one or more aspects of the disclosure.

Figure 7:
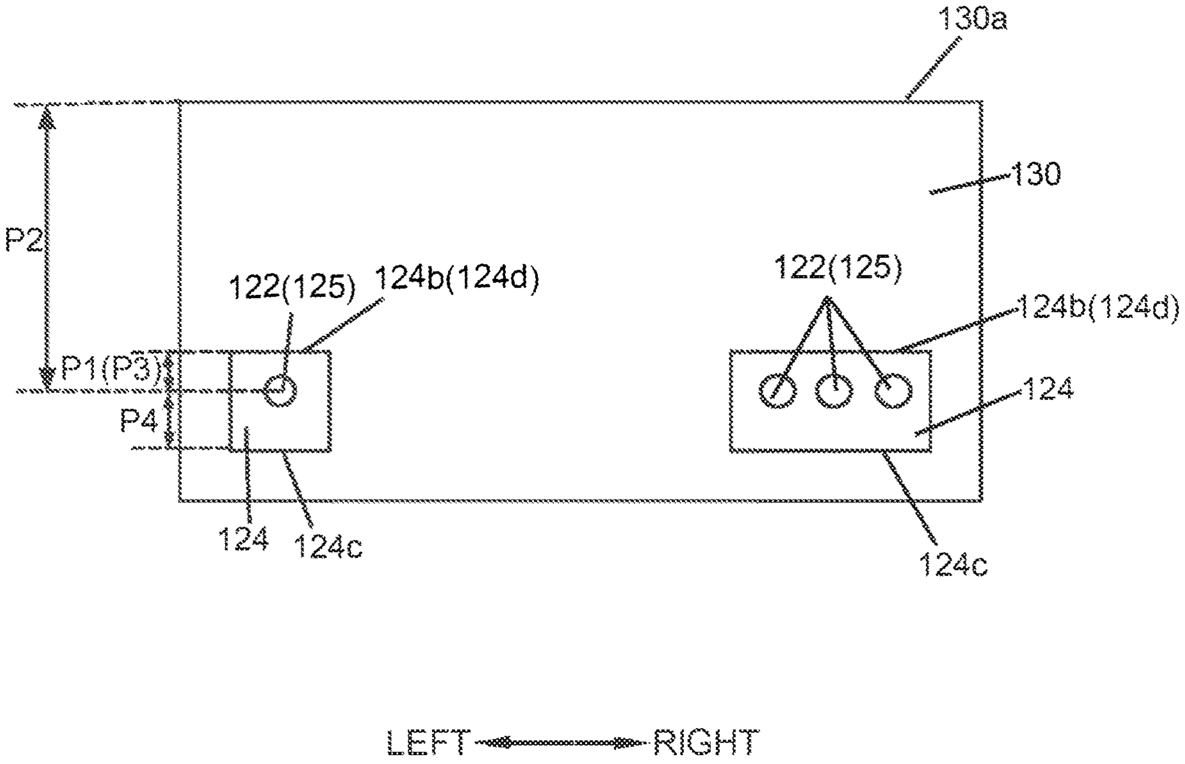
FIG. 7 is a schematic view depicting a positional relationship between the cover member, the cover portion, the refill port, and the sealing member in the first embodiment according to one or more aspects of the disclosure.

As depicted in FIGS. 4 and 5, the inkjet printer 100 includes a printer body 110 and a cover member 130 (e.g., a first cover) of an image reading device including an image reading portion, for example. The printer body 110 has a substantially rectangular parallelepiped shape. The shape of the cover member 130 substantially corresponds to the shape of the printer body 110. The cover member 130 is pivotally connected to the printer body 110 about a pivot shaft 130*a* (as shown in FIG. 7), and is pivotable between an opened position and a closed position. When the cover member 130 is in the opened position, the cover member 130 is opened with respect to the printer body 110, and when the cover member 130 is in the closed position, the cover member 130 covers the printer body 110.

The printer body 110 includes two ink containers 120. Specifically, the printer body 110 includes a left-side ink container 120 (as an example of a second ink container) and a right-side ink container 120 (as an example of a first ink container) on the front side thereof at the interval between the left side and the right side, respectively. Although two of the ink containers are disposed in the illustrated embodiment, more than two of the ink containers may be disposed.

As depicted in FIGS. 4 and 5, the left-side ink container 120 and the right-side ink container 120 have the same structure except that the number of the ink containing portions included is different. Specifically, the left-side ink container 120 includes one ink containing portion 121, which is usually used to contain black ink to be supplied to the printer body 110, and the right-side ink container 120 includes three ink containing portions 121, each of which is usually used to contain cyan ink, magenta ink, and yellow ink, respectively, to be supplied to the printer body 110. Thus, the inkjet printer 100 can record a color image by using the four colors of ink, e.g., black, cyan, magenta, and yellow. Each of the ink containers 120 may include six, eight, or twelve ink containing portions to record the color image using six, eight, or twelve colors of ink, respectively. Alternatively, each of the ink containers 120 may include one, two, three, or other number of ink containing portions.

A refill port 122 (e.g., a port) which is opened upward is formed on a top portion of the ink containing portion 121. The refill port 122 communicates with an inner space of the ink containing portion 121 to allow the user to pour ink into the ink containing portion 121 therethrough.

Figure 6:
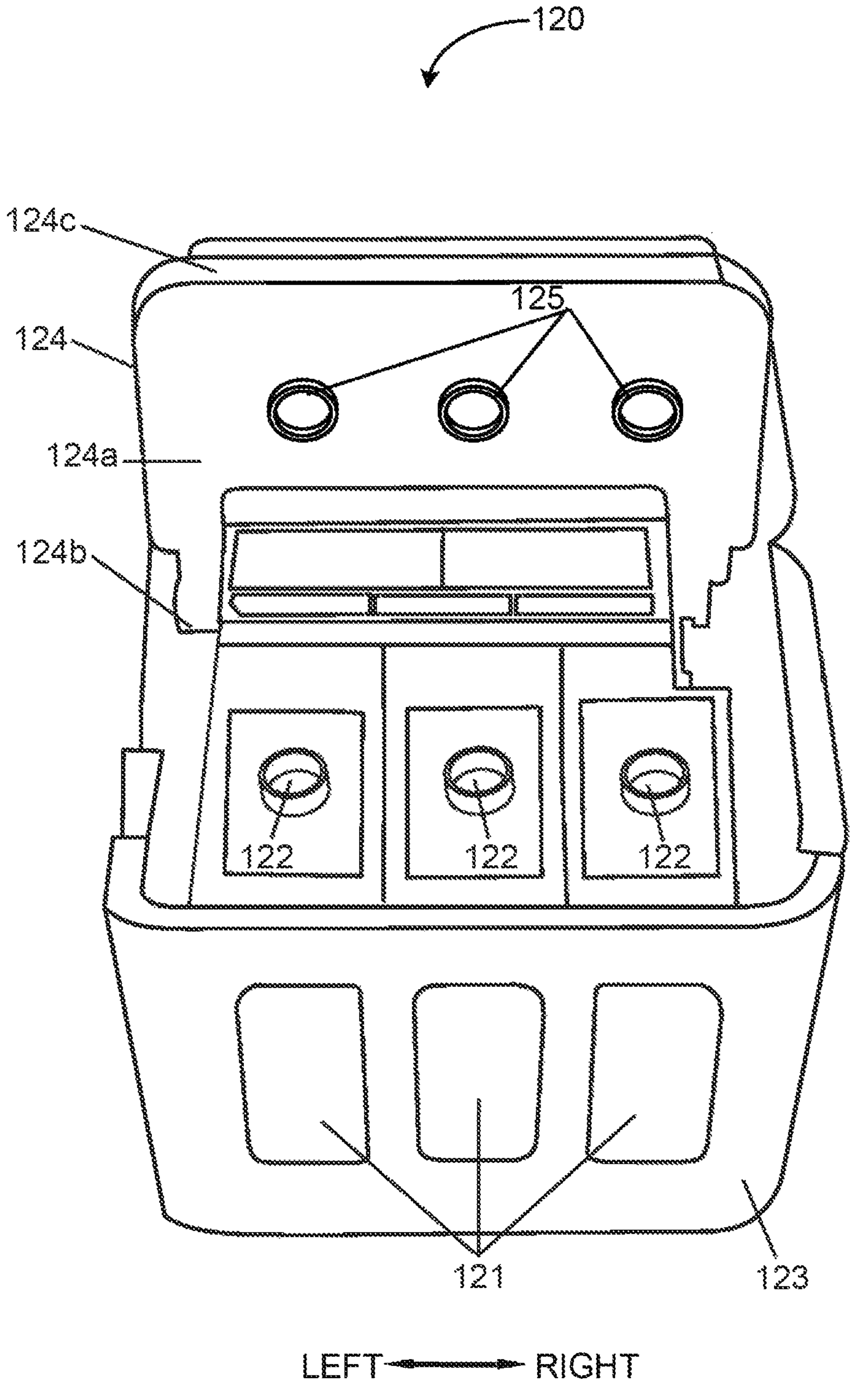
FIG. 6 is a perspective view depicting an ink container of the inkjet printer of FIG. 5, in which the cover portion is opened.

The ink container 120 further includes a frame portion 123 and a cover portion 124 (e.g., a second cover). The frame portion 123 is configured to fix the ink containing portion 121 and cover the outside of the ink containing portion 121. The cover portion 124 has a substantially plate shape and is pivotally connected to the frame portion 123 about a pivot axis 124*d* (as shown in FIG. 7). Specifically, the cover portion 124 is pivotable between an opened position and a closed position with respect to the frame portion 123. When the cover portion 124 is in the closed position, the cover portion 124 covers the refill port 122, and when the cover portion 124 is in the opened position, the refill port 122 is exposed. FIGS. 5 and 6 show a state that the cover portion 124 is in the opened position, and the user may pour ink in the refill port 122 after pivoting the cover portion 124 from the closed position to the opened position to expose the refill port 122.

As depicted in FIGS. 5 and 6, the cover portion 124 of the right-side ink container 120 is provided with a plurality of sealing members 125 on an opposing surface 124*a* which faces the frame portion 123. The number and position of the sealing member 125 correspond to the number and position of the refill port 122, respectively. When the cover portion 124 is in the closed position, the sealing member 125 seals the refill port 122, and when the cover portion 124 is in the opened position, the sealing member 125 is separated from the refill port 122 and is held on the cover portion 124. For pouring ink into the refill port 122, the sealing member 125 is held on the cover portion 124 such that the sealing member 125 is separated from the refill port 122, thereby reducing contamination of the user's hand or other objects with the ink adhered to the sealing member 125. Further, pivoting the cover portion 124 with the sealing member 125 from the opened position to the closed position causes the sealing member 125 to directly seal the refill port 122 without additional operation, thereby simplifying the user's operation.

FIG. 7 is a schematic view depicting a positional relationship between the cover member 130, the cover portion 124, the refill port 125, and the sealing member 122 when both of the cover member 130 and the cover portion 124 are in the closed position. As described above, when the cover portion 124 is in the closed position, the sealing member 125 seals the refill port 122. As depicted in FIG. 7, the shortest horizontal distance P1 from the pivot axis 124*d* of the cover portion 124 to the center of the refill port 122 is less than the shortest horizontal distance P2 from the pivot shaft 130*a* of the cover member 130 to the center of the refill port 122.

As described above, the present disclosure describes an inkjet printer, in which the sealing member 125 is provided on the bottom surface, e.g., the opposing surface 124*a*, of the cover portion 124 cover the ink containing portion 121, and the sealing member 125 seals the refill port 122 and separates from the refill port 122 according to pivotal movement of the cover portion 124 with respect to the ink containing portion 121.

In the present disclosure, however, it is also to be considered that play may be provided around the pivot axis 124*d* of the cover portion 124 to allow manufacturing and installation, and the play may affect the positioning accuracy between the sealing member 125 and the refill port 122. The refill port 122 not reliably sealed may cause problems such as leakage of ink. In this case, there may be a discrepancy between the presence of the play around the pivot axis and the need for high positioning accuracy between the sealing member and the refill port. Refer to FIG. 7, in order to allow the sealing member 125 to more smoothly and reliably seal the refill port 122 when the cover portion 124 is pivoted from the opened position to the closed position, it may be preferable that the position of the sealing member 125 on the cover portion 124 satisfies the following relationship: the shortest horizontal distance P3 from the sealing member 125 to the pivot axis 124*d* of the cover portion 124 is less than the shortest horizontal distance P4 from the sealing member 125 to a distal end 124*c* of the cover portion 124. The pivot axis 124*d* is a center line of the pivot shaft of the cover portion 124 and positioned at a pivot end 124*b*. The distal end 124*c* is opposed to the pivot end 124*b*, i.e. the distal end 124*c* is positioned at the opposite end of the pivot end 124*b*. Thus, the corresponding refill port 122 and sealing member 125 may be disposed as close as possible to the pivot end 124*b*, thereby minimizing effect of the play around the pivot axis 124*d* on the positioning accuracy between the sealing member 125 and the refill port 122, and improving the positioning accuracy.

As described above, in the inkjet printer according to the present disclosure, while the sealing member is held on the cover portion, the sealing member seals the refill port and separates from the refill port according to pivotal movement of the cover portion with respect to the ink containing portion, thereby not only solving the problem of leaving the sealing member unattended to contaminate the user's hand or other objects, but also simplifying the user's operation.

While the disclosure has been described in detail with reference to the specific embodiments thereof, these are merely examples, and various changes, arrangements and modifications may be applied therein without departing from the spirit and scope of the disclosure.

What is claimed is:

1. An inkjet printer comprising:

a printer body including an ink containing portion configured to contain one color of ink to be supplied to the printer body, a top portion of the ink containing portion including only one port, the port communicating with an inner space of the ink containing portion;

a first cover pivotable about a first axis between a first opened position, in which the first cover is opened with respect to the ink containing portion, and a first closed position, in which the first cover covers the ink containing portion;

a second cover pivotable about a second axis between a second opened position, in which the second cover is opened with respect to the ink containing portion, and a second closed position, in which the second cover covers the ink containing portion, the second cover including only one sealing member configured to seal the port; and a third cover configured to cover an ink containing portion having a port and configured to contain an ink of a color other than the one color, the third cover including a sealing member configured to seal the port, wherein a distance of the second cover from a center of the sealing member to the second axis is less than a distance of the first cover from a point, which corresponds to the center of the sealing member, to the first axis, and wherein a distance of the third cover from a center of the sealing member to the second axis is less than a distance of the third cover from a point, which corresponds to the center of the sealing member, to the first axis.

2. The inkjet printer according to claim 1, wherein a trajectory along which the second cover pivots between the second opened position and the second closed position is positioned inside a trajectory along which the first cover pivots between the first opened position and the first closed position.

3. The inkjet printer according to claim 1, wherein the one color is black.

4. The inkjet printer according to claim 1, wherein the third cover is spaced from the second cover.

5. The inkjet printer according to claim 4, wherein a sheet discharge opening is positioned between the third cover and the second cover.

6. The inkjet printer according to claim 1, wherein the third cover includes three of the sealing members.

7. The inkjet printer according to claim 1, wherein the ink containing portion configured to contain one color of ink is located on one side of the inkjet printer when viewed from the front.

8. The inkjet printer according to claim 7, wherein the one side is located is the left side.

9. The inkjet printer according to claim 8, wherein the ink containing portion configured to contain the ink of a color other than the one color is located on the right side of the inkjet printer when viewed from the front.

10. The inkjet printer according to claim 7, wherein the ink containing portion configured to contain the ink of a color other than the one color is located on a side of the inkjet printer other than the one side when viewed from the front.

11. The inkjet printer according to claim 1, wherein the third cover includes three of the sealing members.

12. An inkjet printer comprising:

a printer body including an ink containing portion configured to contain one color of ink to be supplied to the printer body, a top portion of the ink containing portion including only one port, the port communicating with an inner space of the ink containing portion;

a first supporting member pivotable about an axis between an exposed position, in which the port is exposed, and a covering position, in which the first supporting member covers the port, the supporting member including only one sealing member configured to seal the port;

a second supporting member configured to cover an ink containing portion including a port and configured to contain an ink of a color other than the one color, the second supporting member including a sealing member configured to seal the port; and a cover pivotable about another axis between an opened position, in which the supporting member is exposed, and a closed position, in which the cover covers the first supporting member and the second supporting member, wherein a distance of the first supporting member from a center of the sealing member to the axis is less than a distance of the cover from a point, which corresponds to the center of the sealing member, to the another axis, and wherein a distance of the second supporting member from a center of the sealing member to the axis is less than a distance of the cover from a point, which corresponds to the center of the sealing member, to the another axis.

* * * * *